US011875760B2

(12) United States Patent
Matsui et al.

(10) Patent No.: US 11,875,760 B2
(45) Date of Patent: Jan. 16, 2024

(54) DISPLAY SYSTEM

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 17/472,966

(22) Filed: Sep. 13, 2021

(65) Prior Publication Data

US 2021/0407466 A1 Dec. 30, 2021

Related U.S. Application Data

(63) Continuation of application No. PCT/JP2020/007110, filed on Feb. 21, 2020.

(30) Foreign Application Priority Data

May 22, 2019 (JP) ................................ 2019-096324

(51) Int. Cl.
   *G09G 5/38* (2006.01)
   *G06T 7/269* (2017.01)
   (Continued)

(52) U.S. Cl.
   CPC ............... *G09G 5/38* (2013.01); *B60K 35/00* (2013.01); *G02B 27/0101* (2013.01);
   (Continued)

(58) Field of Classification Search
   CPC ... G09G 5/38; G06T 7/269; B60K 2370/1529
   See application file for complete search history.

(56) References Cited

U.S. PATENT DOCUMENTS

2010/0164702 A1 7/2010 Sasaki et al.
2012/0050138 A1 3/2012 Sato et al.
(Continued)

FOREIGN PATENT DOCUMENTS

JP 2010-156608 7/2010
JP 2010-256878 11/2010
(Continued)

OTHER PUBLICATIONS

English translation of International Preliminary Report on Patentability dated Nov. 16, 2021 in International (PCT) Application No. PCT/JP2020/007110.
(Continued)

*Primary Examiner* — Samantha (Yuehan) Wang
(74) *Attorney, Agent, or Firm* — Wenderoth, Lind & Ponack, L.L.P.

(57) ABSTRACT

A display system includes an information acquisition device that acquires a position of a moving body, a display processing device that controls display of an image based on information acquired by the information acquisition device, a posture detection device that detects a posture variation of the moving body, a correction processing device that sets a first correction amount based on the posture variation, a gradient correction processing device that sets a second correction amount based on gradient information and a superimposition destination position at which the image is superimposed on an actual view in a display direction of the image, and a correction overlap amount setting unit that sets a correction overlap amount by which the first correction amount and the second correction amount overlap. The display processing device controls display of the image based on the first correction amount, the second correction amount, and the correction overlap amount.

20 Claims, 11 Drawing Sheets

(51) Int. Cl.
*G06T 7/70* (2017.01)
*B60K 35/00* (2006.01)
*G02B 27/01* (2006.01)
*G06T 11/00* (2006.01)

(52) U.S. Cl.
CPC ............. *G06T 7/269* (2017.01); *G06T 7/70* (2017.01); *G06T 11/00* (2013.01); *B60K 2370/1529* (2019.05); *G02B 2027/014* (2013.01); *G02B 2027/0138* (2013.01); *G06T 2207/30252* (2013.01); *G09G 2340/0464* (2013.01); *G09G 2380/10* (2013.01)

(56) References Cited

U.S. PATENT DOCUMENTS

2016/0216521 A1* 7/2016 Yachida .................. B60R 1/00
2019/0025580 A1* 1/2019 Nagano ................ H04N 9/3194
2020/0064629 A1 2/2020 Yamashita et al.

FOREIGN PATENT DOCUMENTS

| | | |
|---|---|---|
| JP | 2015-101311 | 6/2015 |
| JP | 2018-167669 | 11/2018 |
| JP | 2018-189590 | 11/2018 |
| JP | 2019-59247 | 4/2019 |
| KR | 10-2017-0057892 | 5/2017 |
| KR | 10-2017-0065082 | 6/2017 |

OTHER PUBLICATIONS

International Search Report dated Apr. 21, 2020 in International (PCT) Application No. PCT/2020/007110 with English translation.

* cited by examiner

DISPLAY SYSTEM

CROSS-REFERENCE TO RELATED APPLICATIONS

This is a continuation application of International Application No. PCT/JP2020/007110, with an international filing date of Feb. 21, 2020, which claims priority of Japanese Patent Application No. 2019-096324 filed on May 22, 2019, the content of which is incorporated herein by reference.

BACKGROUND OF THE INVENTION

1. Technical Field

The present disclosure relates to a display system that controls a display position of an image according to the movement of a moving body.

2. Description of Related Art

JP 2015-101311 A discloses a vehicle information projection system that performs augmented reality (AR) display using a head-up display (HUD) device. The HUD device projects light representing a virtual image on the windshield of a vehicle so that a viewer who is an occupant of the vehicle visually recognizes the virtual image together with an actual view of the outside world of the vehicle. For example, a virtual image representing a guide route of the vehicle is displayed in association with a display target (for example, road) in the actual view. In this manner, the occupant can confirm the guide route while visually recognizing the actual view. The vehicle information projection system of JP 2015-101311 includes a vehicle speed sensor and corrects a display position of the virtual image according to acceleration. This restricts generation of position displacement of the virtual image when the vehicle is suddenly decelerated and suddenly accelerated.

SUMMARY

The present disclosure provides a display system that suppresses position displacement of a display position of an image.

A display system of the present disclosure includes an information acquisition device that acquires a position of a moving body, a display processing device that controls display of an image based on information acquired by the information acquisition device, a posture detection device that detects a posture variation of the moving body, a correction processing device that sets a first correction amount of a display position of the image based on a posture variation of the moving body, a gradient correction processing device that sets a second correction amount of a display position of the image based on gradient information at a position of the moving body and a superimposition destination position at which the image is superimposed on an actual view in a display direction of the image, and a correction overlap amount setting unit that sets a correction overlap amount by which the first correction amount and the second correction amount overlap. The display processing device controls display of the image based on the first correction amount, the second correction amount, and the correction overlap amount.

These general and specific aspects may be realized by a system, a method, and a computer program, and a combination of these.

According to the display system of the present disclosure, position displacement of a display position of an image can be suppressed.

DETAILED EMBODIMENTS (Findings that Form the Basis of the Present Disclosure)

As a display system, for example, a head-up display (HUD) system that superimposes predetermined information (virtual image) on a specific target that is an actual view is known. For example, in the HUD system, vibration correction processing in which a state (For example, a posture) of a moving body dynamically changing due to unevenness of a road surface, acceleration/deceleration of the moving body, or the like is calculated from an output of a gyro sensor to correct a display position is performed. Further, the HUD system performs gradient correction processing of calculating a road surface gradient difference between an own position and a location in the front and correcting display (position and inclination).

In the gradient correction processing, the display displacement of a virtual image with respect to a superimposition target is corrected according to a gradient difference between an own position and a superimposition destination position in front. Since information on a gradient change at an own position is also included in an output of a gyro sensor, there is a case where display displacement correction by the vibration correction processing and the gradient correction processing overlap. In this case, the display displacement correction becomes overcorrection, and superimposition accuracy of the virtual image after correction on a superimposition target may be lowered. The superimposition target is a person, a sign, a road, or the like.

In view of the above, as a result of intensive studies, the present inventors have devised a display system that calculates a correction overlap amount between vibration correction and gradient correction and corrects display of a virtual image on the basis of the vibration correction, the gradient correction, and the correction overlap amount.

In this manner, overcorrection by display displacement correction of a virtual image can be suppressed, and lowering in accuracy of a display position of a virtual image after correction can be suppressed. Hereinafter, a display system of the present disclosure will be described.

First Embodiment

Hereinafter, the first embodiment will be described with reference to the drawings. In the first embodiment, a case where the moving body is a vehicle such as an automobile and the display system is a head-up display (HUD) system that displays a virtual image as an image in front of the windshield of the vehicle will be described as an example.

1. Configuration of Display System

Figure 1:
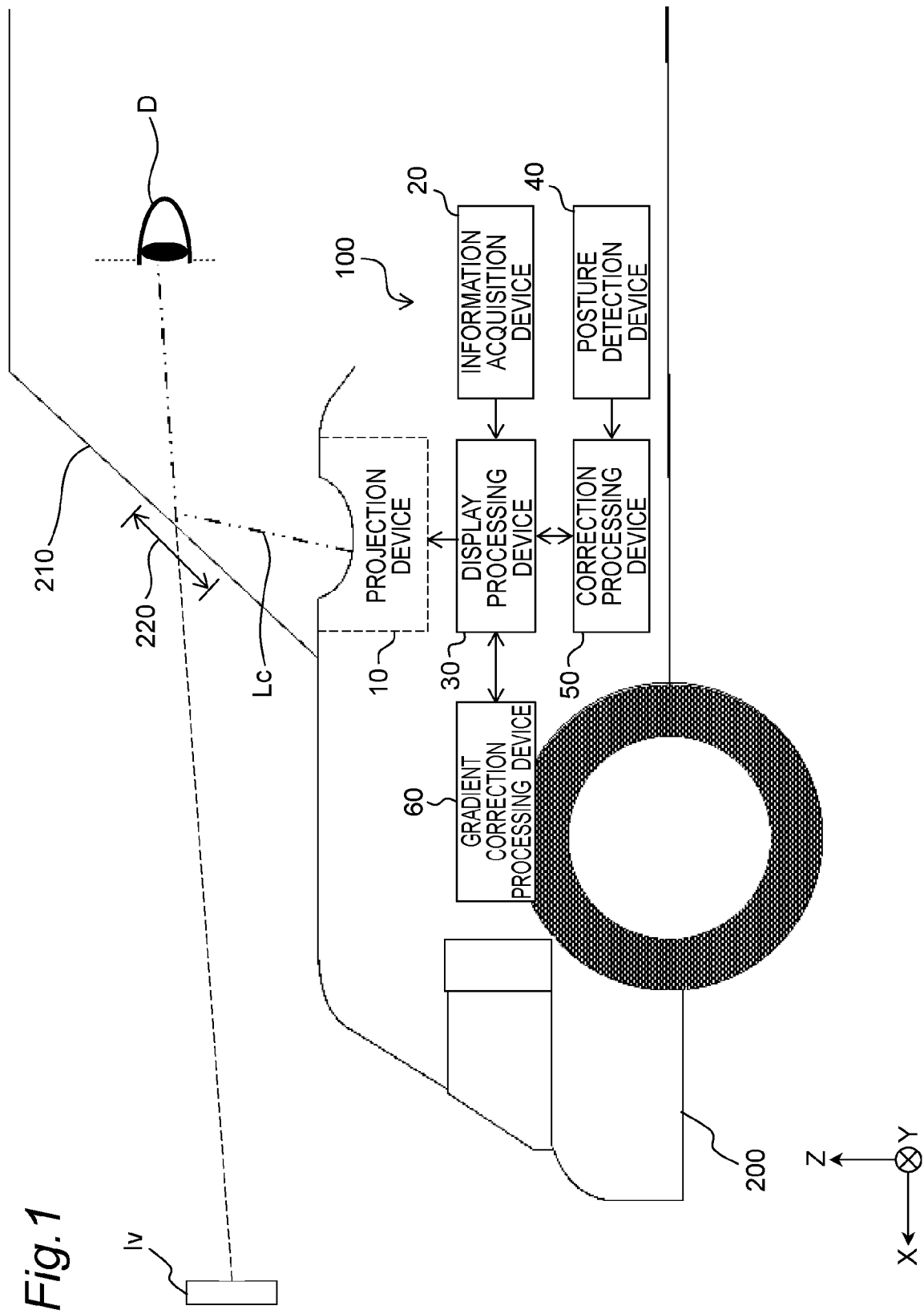
FIG. 1 is a diagram for explaining a head-up display (HUD).

FIG. 1 is a diagram for explaining the HUD system. In FIG. 1, a roll axis of a vehicle 200 is the X axis, a pitch axis of the vehicle 200 is the Y axis, and a yaw axis of the vehicle 200 is the Z axis. That is, the X axis is an axis that is orthogonal to the Y axis and the Z axis and is along a line-of-sight direction of an occupant D who visually recognizes a virtual image Iv. The Y axis is an axis along the left-right direction when viewed from the occupant D who visually recognizes the virtual image Iv. The Z axis is an axis along the height direction of the vehicle 200.

A display system 100 of the present embodiment is an HUD system that performs what is called augmented reality (AR) display in which the virtual image Iv is superimposed on an actual view in front of a windshield 210 of the vehicle 200. The virtual image Iv indicates predetermined information. For example, the virtual image Iv is a figure and/or a character indicating a route for guiding to a destination, an estimated time of arrival at the destination, a traveling direction, a speed, various warnings, and the like. The display system 100 is installed in the vehicle 200 and projects display light Lc representing the virtual image Iv into a display area 220 of the windshield 210 of the vehicle 200. In the present embodiment, the display area 220 is a partial area of the windshield 210. Note that the display area 220 may be the entire area of the windshield 210. The display light Lc is reflected by the windshield 210 toward the inside of the vehicle. In this manner, the occupant (viewer) D in the vehicle 200 visually recognizes the reflected display light Lc as the virtual image Iv in front of the vehicle 200.

The display system 100 includes a projection device 10, an information acquisition device 20, a display processing device 30, a posture detection device 40, a correction processing device 50, and a gradient correction processing device 60.

The projection device 10 projects the display light Lc representing the virtual image Iv into the display area 220. The projection device 10 includes, for example, a liquid crystal display element that displays an image of the virtual image Iv, a light source such as an LED that illuminates the liquid crystal display element, a mirror and a lens that reflect the display light Lc of the image displayed by the liquid crystal display element onto the display area 220, and the like. The projection device 10 is installed, for example, in the dashboard of the vehicle 200.

The information acquisition device 20 acquires a position of the vehicle 200. Specifically, the information acquisition device 20 measures a position of the vehicle 200 and generates position information indicating the position. The information acquisition device 20 outputs vehicle-related information including the position information of the vehicle 200.

The display processing device 30 controls the display of the virtual image Iv based on the vehicle-related information and the like obtained from the information acquisition device 20 and outputs image data of the virtual image Iv to the projection device 10. The display processing device 30 may control the display of the virtual image Iv based on a display timing (display time) of the virtual image Iv or a combination of the vehicle-related information and the display timing. The display timing is, for example, repetition of display for ten seconds and non-display for one second.

The posture detection device 40 detects a posture variation of the vehicle 200. In the present embodiment, the posture detection device 40 includes, for example, a gyro sensor 41 (see FIG. 2) that detects an angular velocity. The gyro sensor 41 outputs the detected angular velocity to the correction processing device 50 as posture variation information indicating a posture variation of the vehicle 200.

The correction processing device 50 calculates a correction amount of the display position of the virtual image Iv based on the posture variation of the vehicle 200 detected by the posture detection device 40. In other words, the correction processing device 50 calculates a correction amount for performing the vibration correction processing for correcting display displacement of the virtual image Iv due to the attitude variation of the vehicle 200.

The gradient correction processing device 60 calculates a correction amount of a display position of the virtual image Iv on the basis of a gradient difference between an own position of the vehicle 200 and the superimposition destination position. In other words, the gradient correction processing device 60 calculates a correction amount for performing the gradient correction processing of correcting display displacement of the virtual image Iv with respect to a superimposition target due to a gradient difference between an own position of the vehicle 200 and the superimposition destination position. In the present description, the superimposition destination position is a position where the virtual image Iv is superimposed on the actual view in a display direction of the virtual image Iv, and is a position away by a predetermined distance to the front from the vehicle 200. In the present embodiment, as an example, the superimposition destination position is a position at which the virtual image Iv is superimposed on the actual view in front of the vehicle 200, that is, a position 50 m in front of the vehicle 200. Note that the superimposition destination position is not limited to the position 50 m in front of the vehicle 200, and may be changed according to, for example, a type of the virtual image Iv, a state (position and posture) of the vehicle 200, map data, and the like.

Figure 2:
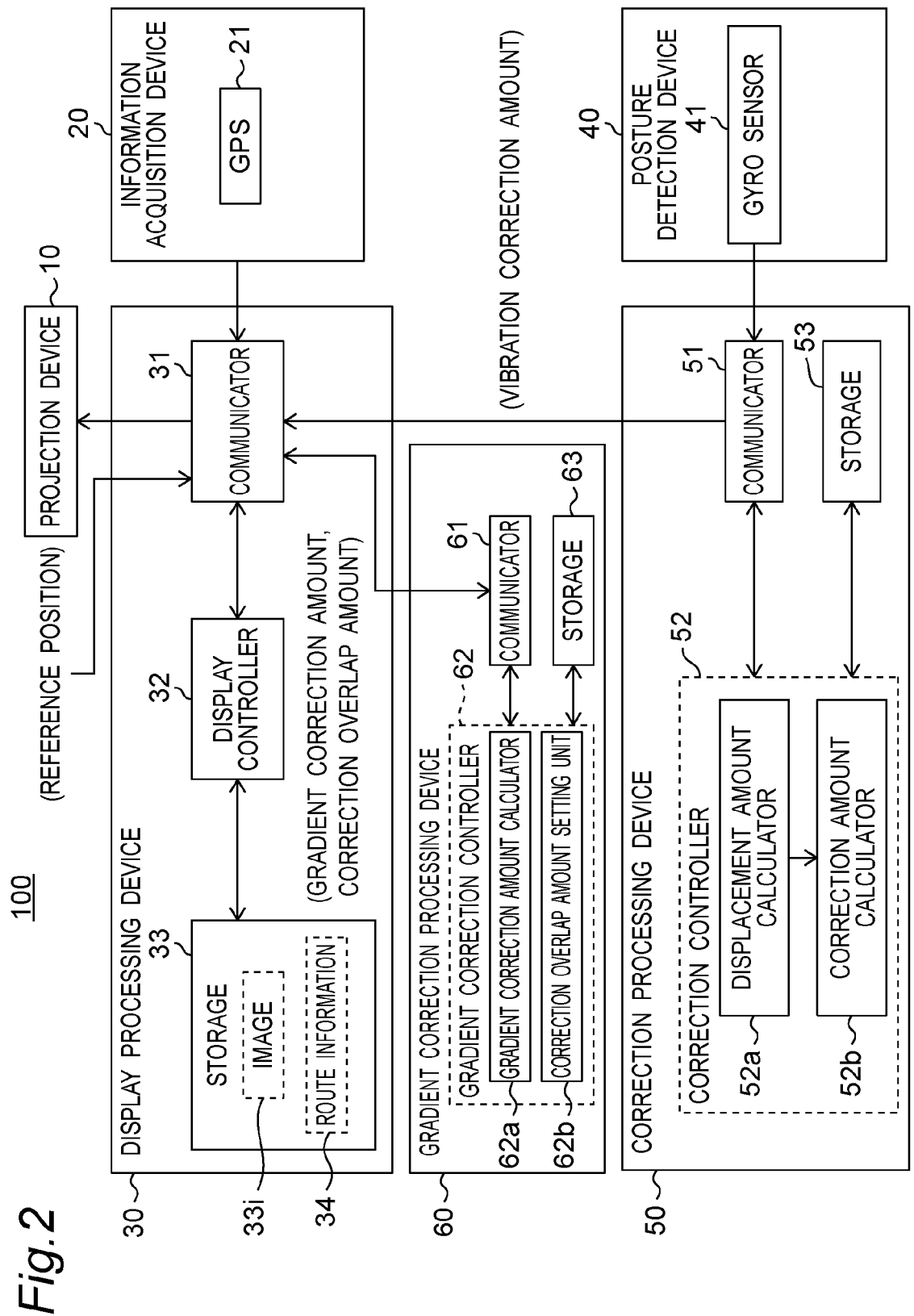
FIG. 2 is a block diagram showing an internal configuration of a display system according to a first embodiment.

FIG. 2 is a block diagram showing an internal configuration of the display system 100.

In the present embodiment, the information acquisition device 20 includes a global positioning system (GPS) module 21 that detects a position indicating the current position of the vehicle 200 in the geographical coordinate system. Specifically, the GPS module 21 receives radio waves from GPS satellites and measures the latitude and longitude of the receiving point. The GPS module 21 generates position information indicating the measured latitude and longitude. The information acquisition device 20 outputs the vehicle-related information including the position information to the display processing device 30.

The display processing device 30 includes a communicator 31, a display controller 32, and a storage 33.

The communicator 31 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The display controller 32 can be realized by a semiconductor element or the like. The display controller 32 can be composed of, for example, a microcomputer, a CPU, an MPU, a GPU, a DSP, an FPGA, and an ASIC. A function of the display controller 32 may be configured only by hardware, or may be realized by combining hardware and software. The display controller 32 realizes a predetermined function by reading data and a program stored in the storage 33 and performing various types of arithmetic processing.

The storage 33 is a storage medium that stores a program and data required to realize a function of the display processing device 30. The storage 33 can be realized by, for example, a hard disk (HDD), an SSD, a RAM, a DRAM, a ferroelectric memory, a flash memory, a magnetic disk, or a combination of these.

The storage 33 stores a plurality of pieces of image data 33$i$ representing the virtual image Iv. The display controller 32 determines the virtual image Iv to be displayed based on the vehicle-related information obtained from the information acquisition device 20. The display controller 32 reads out the image data 33$i$ of the determined virtual image Iv from the storage 33 and outputs the data to the projection device 10. Furthermore, the display controller 32 sets the display position of the virtual image Iv.

Further, the storage 33 stores route information 34. The route information 34 means information on a route on which the vehicle 200 travels. For example, the route information 34 includes altitude information of a plurality of positions at predetermined intervals on the route. As the altitude information, for example, altitude data of Geospatial Information Authority of Japan can be used. The display processing device 30 acquires the route information 34 from the outside and stores the route information 34 in the storage 33. Further, the display processing device 30 reads the route information 34 from the storage 33 and outputs the route information 34 to the gradient correction processing device 60.

The correction processing device 50 includes a communicator 51, a correction controller 52, and a storage 53.

The communicator 51 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The correction controller 52 is an arithmetic device that can be realized by a semiconductor element or the like. The correction controller 52 can be composed of, for example, a microcomputer, a CPU, an MPU, a GPU, a DSP, an FPGA, and an ASIC. A function of the correction controller 52 may be configured only by hardware, or may be realized by combining hardware and software. The correction controller 52 realizes a predetermined function by reading data and a program stored in the storage 53 in the correction processing device 50 and performing various types of arithmetic processing.

The correction controller 52 includes a displacement amount calculator 52$a$ and a correction amount calculator 52$b$ as a functional configuration.

The displacement amount calculator 52$a$ calculates the posture (angle displacement amount) of the vehicle 200 based on the posture variation information output by the posture detection device 40. For example, the displacement amount calculator 52$a$ calculates an angle (a pitch angle) around a pitch axis of the vehicle 200 by integrating the angular velocity detected by the gyro sensor 41. In this manner, a displacement amount (angle) of the vehicle 200 in a rotation direction around the Y axis (pitch axis) shown in FIG. 1 can be calculated. Note that, in the present embodiment, a pitch angle is calculated. However, a yaw angle or a roll angle may be calculated. For example, all angles around the X axis, the Y axis, and the Z axis may be calculated.

The correction amount calculator 52$b$ calculates a correction amount (vibration correction amount) of a display position of the virtual image Iv according to the posture (angle displacement amount) of the vehicle 200.

Specifically, the correction amount calculator 52$b$ converts a displacement amount of the angle (pitch angle) calculated by the displacement amount calculator 52$a$ into the number of pixels, and determines a correction amount by which the number of pixels corresponding to the displacement is eliminated. For example, the correction amount calculator 52$b$ determines a correction amount by which a displacement amount of the pitch angle is eliminated. The correction amount calculator 52$b$ outputs the calculated correction amount to the display processing device 30. Note that, in the present embodiment, a correction amount in the pitch axis direction is calculated. However, a correction amount in the yaw axis direction and the roll direction may be calculated. As to a roll angle, a correction amount by which a displacement amount of the roll angle is eliminated without conversion of the angle.

Calculation processing of an output of the posture detection device 40 may be performed by the posture detection device 40 or the displacement amount calculator 52$a$ of the correction processing device 50, or another configuration.

The storage 53 is a storage medium that stores a program and data required to realize a function of the correction controller 52. Therefore, for example, a program and data necessary for causing an arithmetic device such as a processor to function as the correction controller 52 are stored in the storage 53. The storage 53 can be realized by, for example, a hard disk (HOD), an SSD, a RAM, a DRAM, a ferroelectric memory, a flash memory, a magnetic disk, or a combination of these.

The correction processing device 50 outputs the correction amount to the display processing device 30.

The gradient correction processing device 60 includes a communicator 61, a gradient correction controller 62, and a storage 63.

The communicator 61 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The gradient correction controller 62 is an arithmetic device that can be realized by a semiconductor element or the like. The gradient correction controller 62 can be composed of, for example, a microcomputer, a CPU, an MPU, a GPU, a DSP, an FPGA, and an ASIC. A function of the gradient correction controller 62 may be configured only by hardware, or may be realized by combining hardware and software.

The gradient correction controller 62 includes a gradient correction amount calculator 62a and a correction overlap amount setting unit 62b as a functional configuration.

The gradient correction amount calculator 62a calculates a gradient difference between the own position of the vehicle 200 and the superimposition destination position of the virtual image Iv, and calculates a correction amount (gradient correction amount) of the display position of the virtual image Iv according to the calculated gradient difference. Specifically, the gradient correction amount calculator 62a converts the calculated gradient difference into the number of pixels of a displacement amount, and determines a correction amount by which the number of pixels corresponding to the displacement is eliminated. The gradient correction amount calculator 62a outputs the calculated correction amount to the display processing device 30.

The correction overlap amount setting unit 62b sets a correction overlap amount by which the vibration correction amount calculated by the correction processing device 50 and the gradient correction amount calculated by the gradient correction amount calculator 62a. The correction overlap amount setting unit 62b outputs the calculated correction overlap amount to the display processing device 30.

The storage 63 is a storage medium that stores a program and data required to realize a function of the gradient correction controller 62. Therefore, for example, a program and data necessary for causing an arithmetic device such as a processor to function as the gradient correction controller 62 are stored in the storage 63. The storage 63 can be realized by, for example, a hard disk (HDD), an SSD, a RAM, a DRAM, a ferroelectric memory, a flash memory, a magnetic disk, or a combination of these.

Note that, in the present description, the correction amount calculated by the correction processing device 50 may be referred to as the vibration correction amount or a first correction amount, and the correction amount calculated by the gradient correction processing device 60 may be referred to as the gradient correction amount or a second correction amount.

Figure 3A:
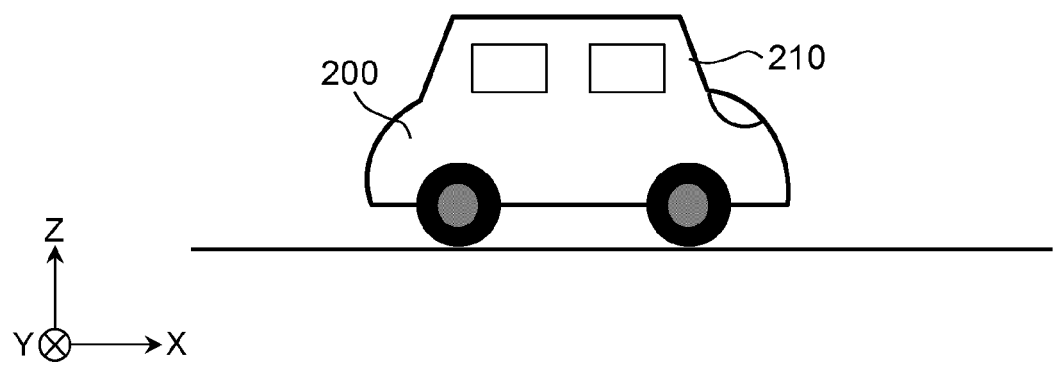
FIG. 3A is a diagram showing an example when a vehicle does not lean.
Figure 3B:
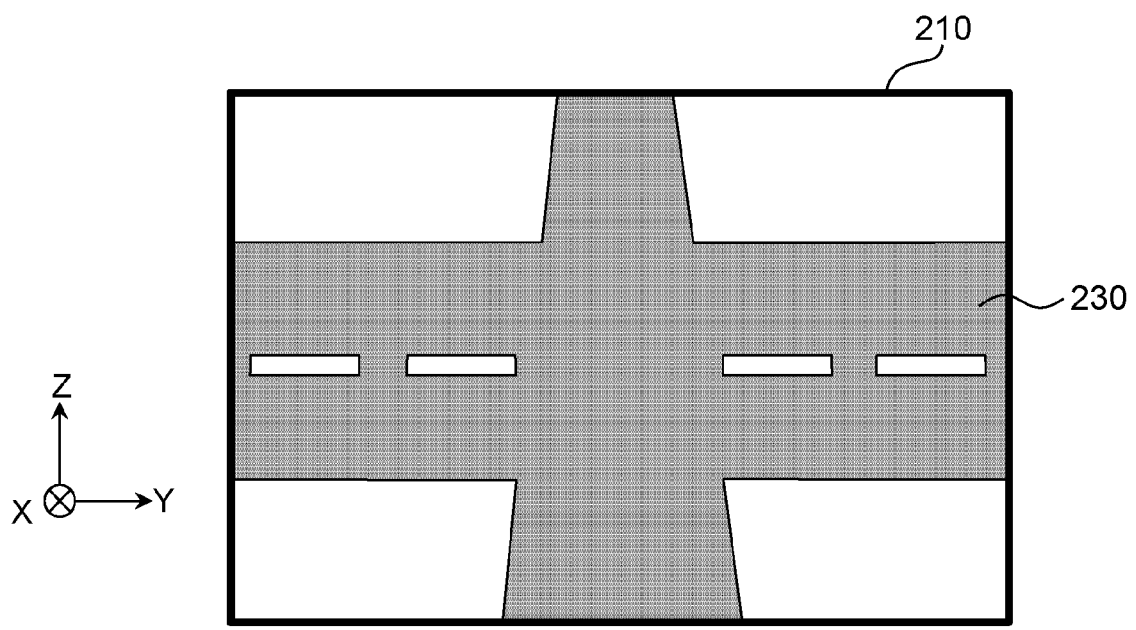
FIG. 3B is a diagram showing an example of an actual view as seen from a windshield.
Figure 3C:
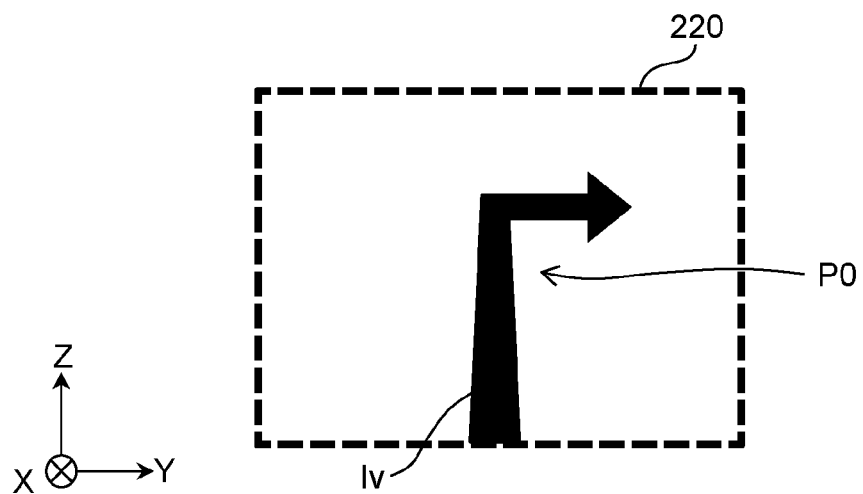
FIG. 3C is a diagram showing an example in which a virtual image is displayed at a reference position.
Figure 3D:
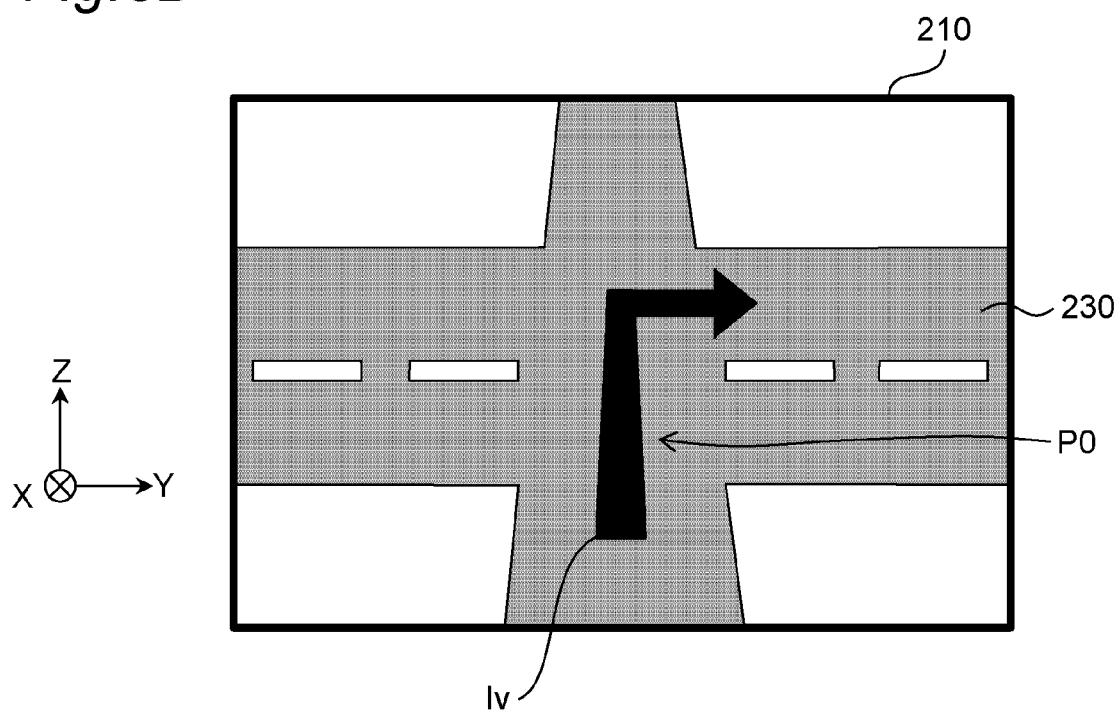
FIG. 3D is a diagram showing an example of augmented reality (AR) display.

AR display will be described with reference to FIGS. 3A to 3D. FIG. 3A shows an example when the vehicle 200 does not lean. FIG. 3B shows an example of an actual view seen from the windshield 210 of the vehicle 200 shown in FIG. 3A. FIG. 3C shows an example of the virtual image Iv seen from the display area 220. FIG. 3D shows an example in which the virtual image Iv shown in FIG. 3C is displayed in a manner superimposed on the actual view shown in FIG. 3B. The display system 100 superimposes the virtual image Iv shown in FIG. 3C on the actual view shown in FIG. 3B. A reference position (initial position) P0 of the virtual image Iv is a position determined based on the type of the virtual image Iv, the state of the vehicle 200 (position and posture), map data, and the like, and the reference position P0 is determined by an external device. For example, in a case where a display target 230 is a cruising lane and the virtual image Iv is an arrow indicating a traveling direction, the reference position P0 is a display position on liquid crystal display when a tip of an arrow indicates the center of the cruising lane. The reference position P0 is set, for example, at a position of a pixel on liquid crystal display corresponding to the values of the Y coordinate and the Z coordinate in the display area 220 in FIG. 3C.

The reference position P0 is acquired from an external device. The external device can be composed of, for example, a microcomputer, a CPU, an MPU, a GPU, a DSP, an FPGA, or an ASIC and the GPS module 21. A function of the external device may be configured only by hardware, or may be realized by combining hardware and software. The reference position P0 output from the external device may change based on a variation in the posture due to the number of occupants, a change in the load, a decrease in fuel, and the like, and may be, for example, different from the reference position (initial position) acquired first. Therefore, the display processing device 30 may change the reference position P0 acquired from the external device based on the variation in the posture due to the number of occupants, the change in the load, the decrease in fuel, and the like. Note that the display processing device 30 may set the reference position P0 based on the vehicle-related information, the map data, and the like. The display processing device 30 may set the size of the virtual image Iv based on the vehicle-related information.

Figure 4A:
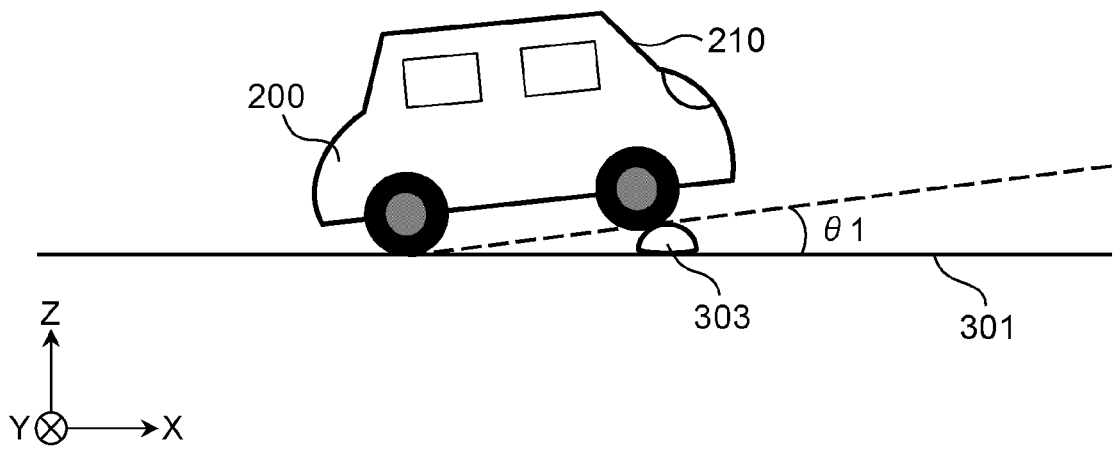
FIG. 4A is a diagram showing a rearward leaning posture of a vehicle.
Figure 4B:
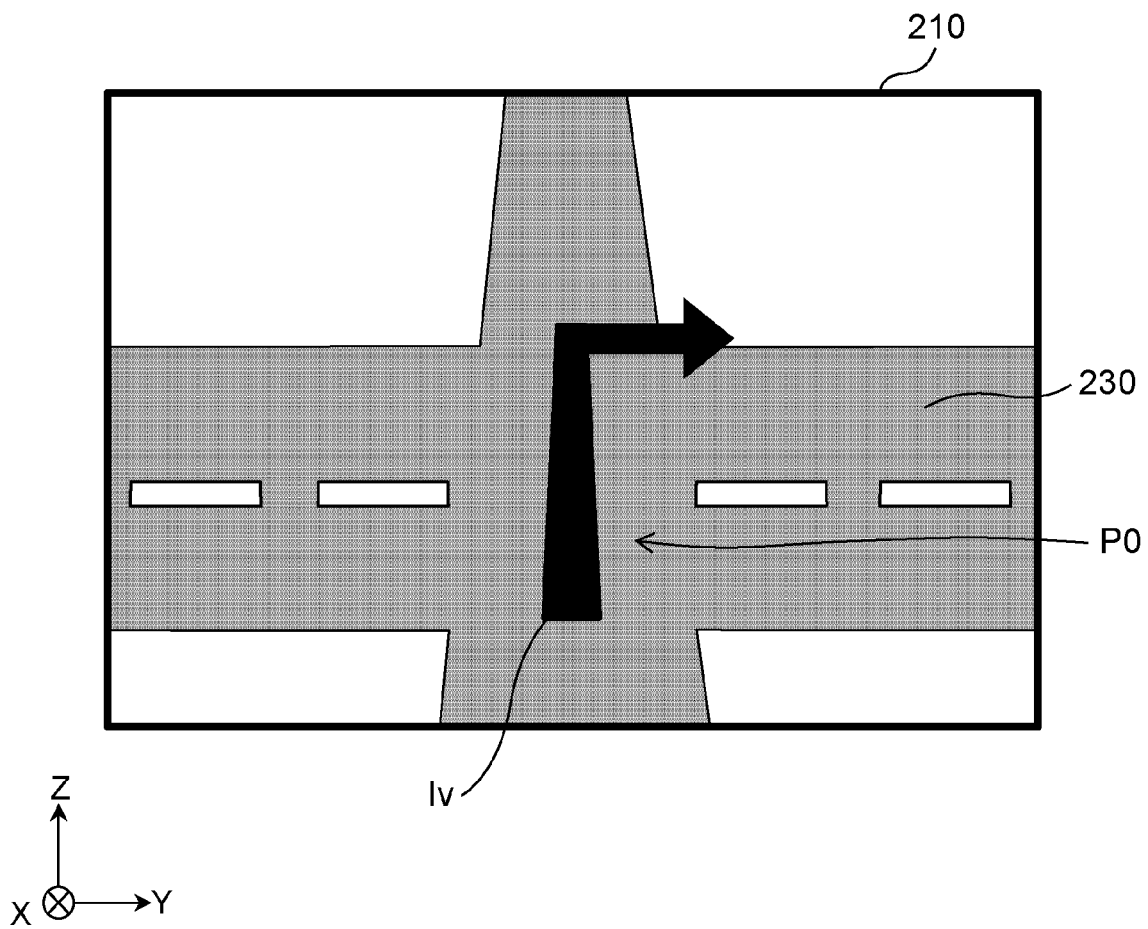
FIG. 4B is a diagram for explaining an example in which position displacement of a virtual image occurs when a vehicle is in a rearward leaning posture.
Figure 4C:
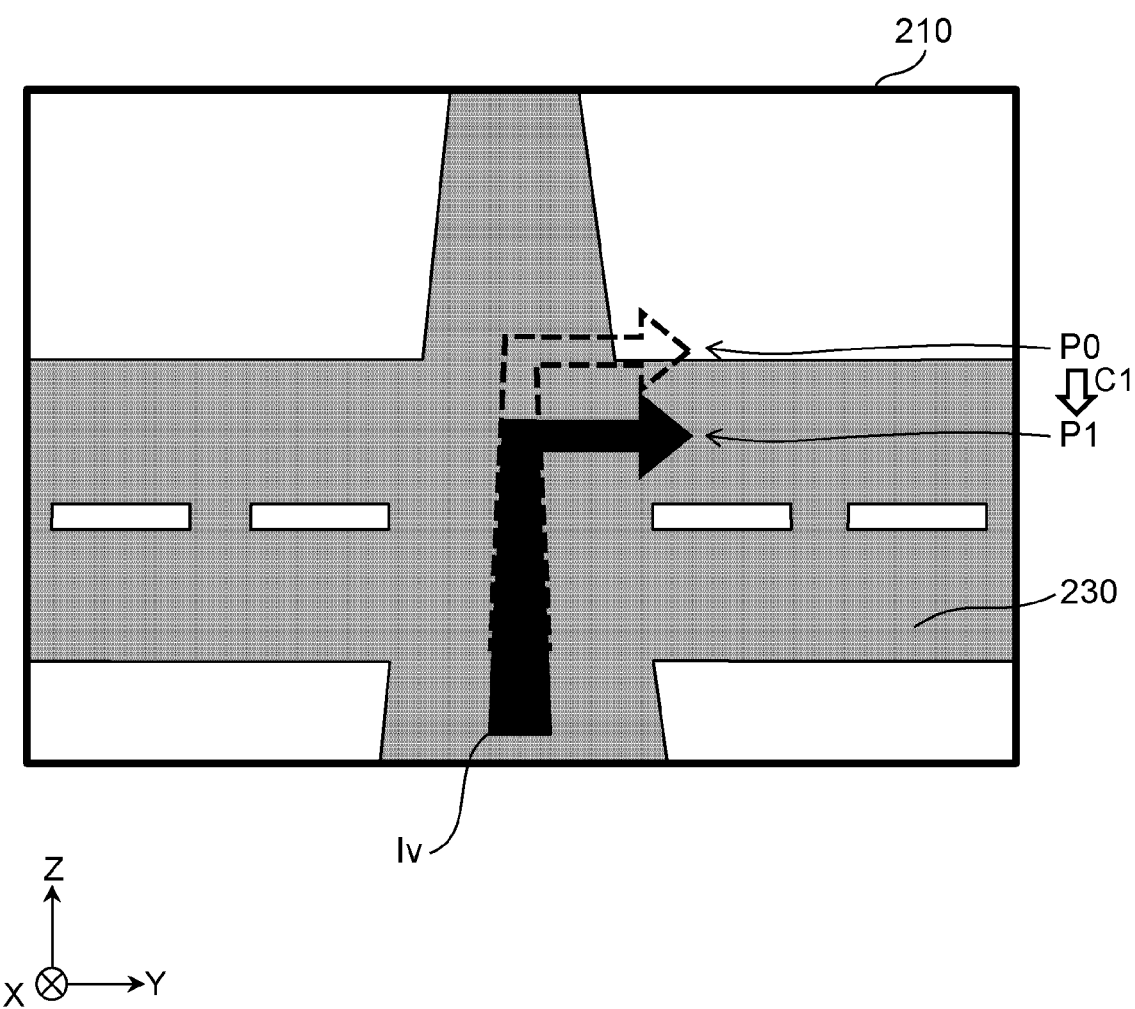
FIG. 4C is a diagram illustrating a display example of a virtual image after vibration correction processing.

The vibration correction processing will be described with reference to FIGS. 4A to 4C. FIG. 4A shows an example of a state in which vehicle 200 is in a rearward leaning posture. FIG. 4B illustrates a case where the display position of the virtual image Iv is displaced from the display target 230 according to the posture variation of the vehicle 200. FIG. 4C shows the display position of the virtual image Iv after vibration correction.

The vehicle 200 may lean due to unevenness of the road surface, sudden acceleration or deceleration of the vehicle 200, or the like. For example, when the vehicle 200 runs on a projecting portion 303 of a road surface 301, the vehicle 200 is in a rearward leaning posture as illustrated in FIG. 4A. In this case, as shown in FIG. 4B, the position of the display target 230 seen from the windshield 210 changes according to an inclination $\theta 1$ with respect to a track of the vehicle 200. For this reason, in a case where the virtual image Iv is displayed at the reference position P0, the virtual image Iv is displaced from the display target 230.

For example, as illustrated in FIG. 4B, when the vehicle 200 is in a rearward leaning posture due to the projecting portion 303 of road surface 301, the position of the display target 230 changes downward from the position during the normal traveling. Therefore, when the display is output at the reference position P0, the tip of the arrow of the displayed virtual image Iv is displaced to the outside of the lane. Therefore, the display system 100 adjusts the display position of the virtual image Iv in the direction of eliminating the displacement according to the posture of the vehicle 200.

Specifically, as shown in FIG. 4C, the correction processing device 50 calculates a correction amount C1 so that the display position becomes a position P1 where there is no displacement in the display position due to the angle of the vehicle 200. That is, the display processing device 30 sets the display position of the virtual image Iv to "reference position P0+correction amount C1". In this manner, the projection device 10 can display the virtual image Iv at the position P1 corresponding to the display target 230. As described above, even in a case where the vehicle 200 leans, the display position of the virtual image Iv is changed from the reference position P0 based on the correction amount C1, so that the virtual image Iv can be displayed at the position P1 corresponding to the display target 230 in the actual view.

Figure 5:
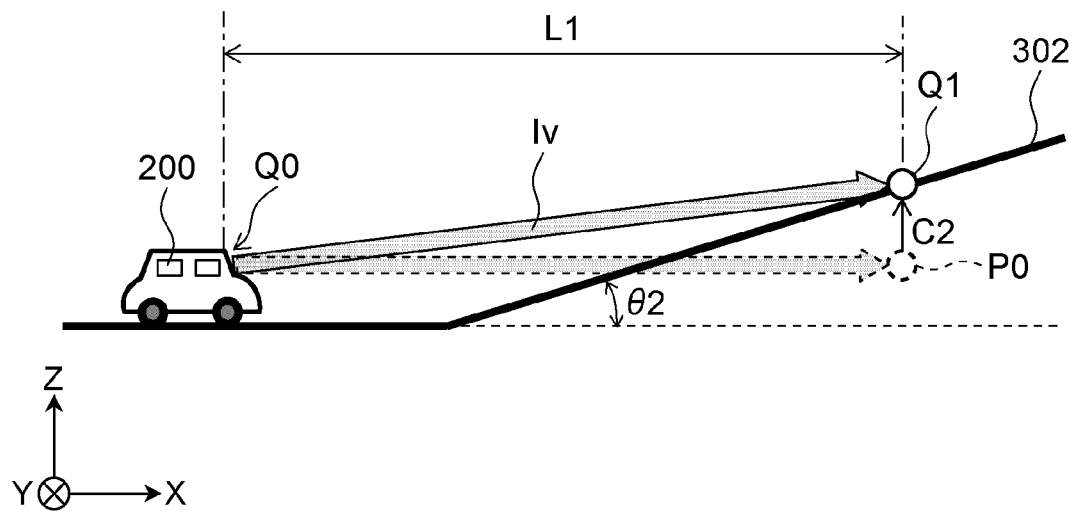
FIG. 5 is a diagram for explaining an example of gradient difference correction processing.

The gradient correction processing will be described with reference to FIG. 5. FIG. 5 is a diagram for explaining an example of the gradient correction processing. As illustrated in FIG. 5, description will be made by exemplifying a case where there is a slope 302 having a grade $\theta 2$ in front of the vehicle 200, and the virtual image Iv is displayed at a superimposition destination position Q1 that is away by a predetermined distance L1 to the front from an own position Q0 of the vehicle 200. Note that, for ease of explanation, there is assumed to be no gradient at the own position Q0 of the vehicle 200.

In a case where there is the slope 302 having the grade $\theta2$ in front of the vehicle 200, when the virtual image Iv is displayed at the reference position P0, the display position of the virtual image Iv is displaced from the superimposition destination position Q1 due to a gradient difference between the own position Q0 of the vehicle 200 and the superimposition destination position Q1. Specifically, the virtual image Iv is displayed below the superimposition destination position Q1. Therefore, the gradient correction processing device 60 adjusts the display position of the virtual image Iv in a direction of eliminating the displacement due to the gradient difference between the own position Q0 of the vehicle 200 and the superimposition destination position Q1.

Specifically, the gradient correction processing device 60 calculates a correction amount C2 so that the display position of the virtual image Iv corresponds to the superimposition destination position Q1 on the basis of the gradient difference between the own position Q0 of the vehicle 200 and the superimposition destination position Q1. That is, the display processing device 30 sets the display position of the virtual image Iv to "reference position P0+correction amount C2". In this manner, the projection device 10 can display the virtual image Iv at the position corresponding to the superimposition destination position Q1 in the display area 220. As described above, even in a case where a gradient of a superimposition destination is changed with respect to the own position, the display position of the virtual image Iv is changed from the reference position P0 on the basis of the correction amount C2, so that the virtual image Iv can be displayed at the position corresponding to the superimposition destination position Q1.

However, since information on a gradient change at the own position Q0 is also included in an output of the gyro sensor 41, there is a case where corrections by the vibration correction processing and the gradient correction processing overlap. That is, the vibration correction processing and the gradient correction processing interfere with each other to cause overcorrection, and the correction accuracy for the display position of the virtual image Iv is lowered.

Figure 6:
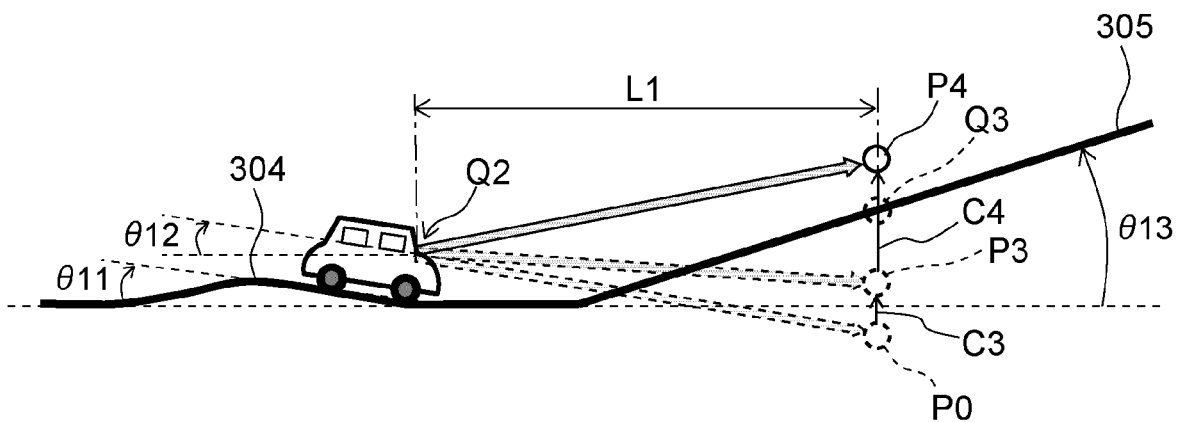
FIG. 6 is an explanatory diagram illustrating an example of overcorrection in a case where both the vibration correction processing and the gradient correction processing are performed.

FIG. 6 is an explanatory diagram illustrating an example of overcorrection in a case where both the vibration correction processing and the gradient correction processing are performed. In the example illustrated in FIG. 6, the vehicle 200 travels on a road surface 304 having a projecting portion with a grade $\theta11$, and the vehicle 200 is in a forward leaning posture at an inclination $\theta12$ with respect to a track. Further, a superimposition destination position Q3 away from the own position Q2 of the vehicle 200 by the predetermined distance L1 is located on a slope 305 having a grade $\theta13$. The grade $\theta13$ is larger than the grade $\theta11$, for example.

Note that the inclination $\theta12$ of the vehicle 200 traveling on the road surface 304 having the grade $\theta11$ changes depending on the suspension of the vehicle 200 and/or the balance of the center of gravity of the vehicle 200. The inclination $\theta12$ of the vehicle 200 is detected by a gyro sensor or the like, and this detection is performed in real time and at a high sampling rate. In contrast, the grade $\theta11$ of the road surface 304 is calculated based on known information (for example, altitude information), and is at a low sampling rate. For this reason, there is a case where the inclination $\theta12$ of the vehicle 200 is not equivalent to the grade $\theta11$ of the road surface 304. In the present embodiment, the inclination $\theta12$ of the vehicle 200 is assumed to be substantially equal to the grade $\theta11$ of the road surface 304.

The correction processing device 50 calculates a vibration correction amount C3 for correcting the displacement of the display position of the virtual image Iv due to vibration generated by the projecting portion of the road surface 304. Specifically, the correction processing device 50 calculates the posture (angle displacement amount) of the vehicle 200, that is, the inclination $\theta12$, based on the posture variation information output by the posture detection device 40. The correction processing device 50 calculates the vibration correction amount C3 so as to eliminate the displacement of the display position of the virtual image Iv caused by the posture (inclination $\theta12$) of the vehicle 200. In the example illustrated in FIG. 6, the correction processing device 50 calculates the vibration correction amount C3 such that the display position of the virtual image Iv moves from the reference position P0 to a position P3 at which the displacement of the display position of the virtual image Iv due to the posture of the vehicle 200 is eliminated.

The gradient correction processing device 60 calculates a gradient correction amount C4 for correcting the displacement of the display position of the virtual image Iv caused by the gradient difference on the basis of the gradient difference between the own position Q2 of the vehicle 200 and the superimposition destination position Q3. Specifically, the gradient correction processing device 60 calculates a gradient difference on the basis of the gradient of the road surface 304 having the projecting portion of the grade $\theta11$ and the gradient of the slope 305 having the grade $\theta13$, and calculates the gradient correction amount C4 so that the displacement of the display position of the virtual image Iv due to the gradient difference is eliminated.

As described above, when both the vibration correction processing by the correction processing device 50 and the gradient correction processing by the gradient correction processing device 60 illustrated in FIG. 6 are performed, the display processing device 30 sets the display position of the virtual image Iv to "reference position P0+vibration correction amount C3 gradient correction amount C4". In the example illustrated in FIG. 6, in the vibration correction processing, the vibration correction amount C3 is calculated on the basis of the inclination $\theta12$ of the vehicle 200 caused by the road surface 304 having the grade $\theta11$. In the gradient correction processing, the gradient correction amount C4 is calculated based on the gradient (grade) $\theta11$ of the road surface 304. For this reason, there is an overlapping correction amount by which the vibration correction amount C3 and the gradient correction amount C4 overlap with each other. Therefore, when both the vibration correction processing and the gradient correction processing are performed, overcorrection occurs. Specifically, when both the vibration correction processing and the gradient correction processing are performed, the virtual image Iv is displayed at a position P4 above the superimposition destination position Q3. As described above, in a case where the vibration correction processing and the gradient correction processing are performed in an overlapping manner, there is a case where the display position of the virtual image Iv after the correction does not correspond to the superimposition destination position Q3 and is displaced from the actual view.

In view of the above, the display system 100 of the present embodiment determines a correction amount of the display position of the virtual image Iv on the basis of the vibration correction amount (first correction amount) by the vibration correction, the gradient correction amount (second correction amount) by the gradient correction, and the correction overlap amount between the vibration correction amount and the gradient correction amount. In this manner, it is possible to suppress overcorrection of the display position of the virtual image Iv due to overlapping of the vibration correction processing and the gradient correction processing, and to suppress deterioration in correction accuracy of the display position of the virtual image after correction. Hereinafter, a display system of the present disclosure will be described.

Figure 7:
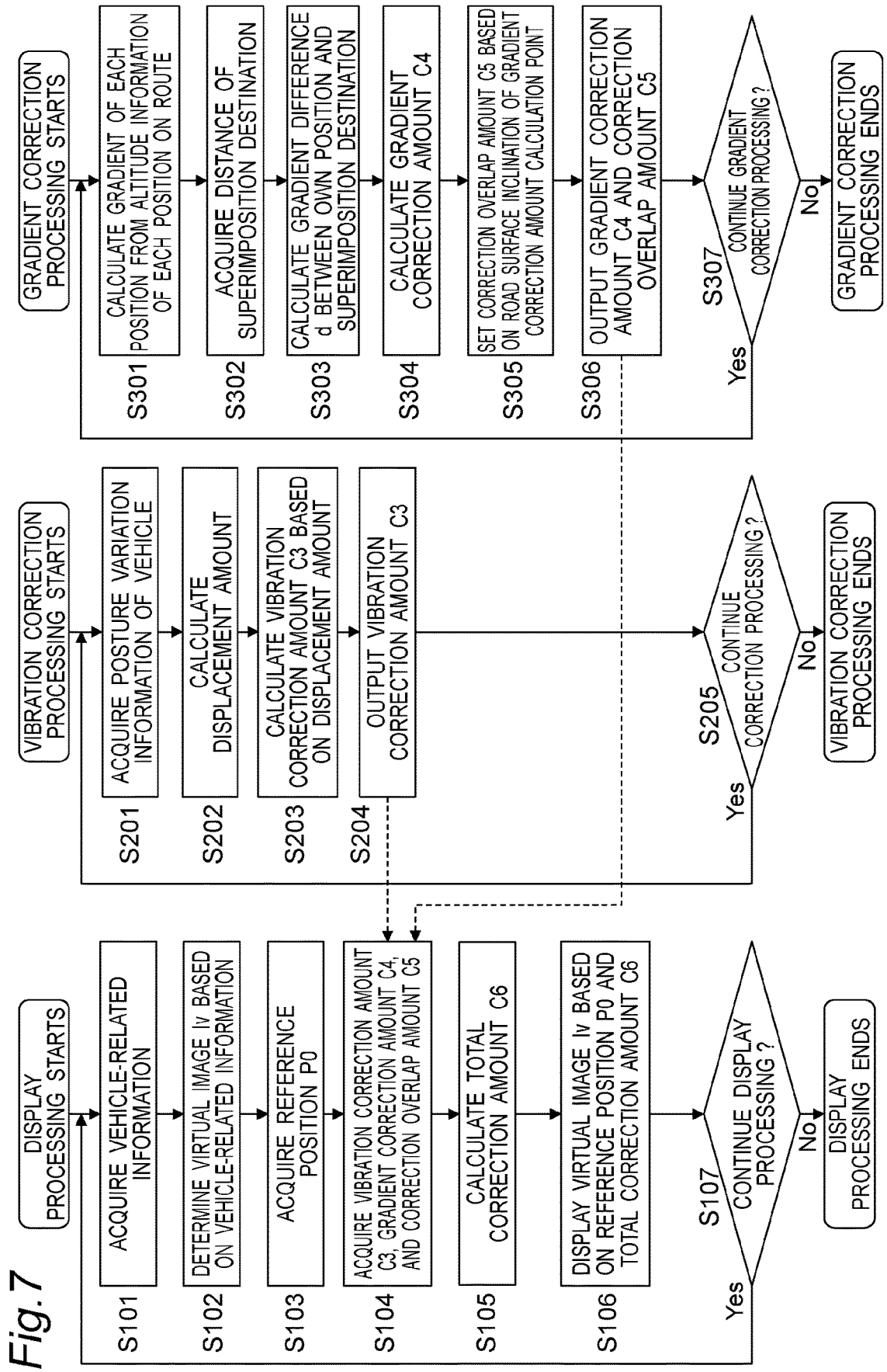
FIG. 7 is a flowchart showing processing of a display system in the first embodiment.

Processing of the display system 100 will be described with reference to FIG. 7. FIG. 7 illustrates a flowchart of display processing, the vibration correction processing, and the gradient correction processing of the display system 100.

2. Display Processing

The display processing illustrated in FIG. 7 is performed by the display controller 32 of the display processing device 30. Further, the display processing is started, for example, when the engine of the vehicle 200 is started or when a button for instructing the start of displaying the virtual image Iv is operated.

The display controller 32 acquires the vehicle-related information from the information acquisition device 20 (S101). The display controller 32 determines the virtual image Iv to be displayed based on the vehicle-related information (S102). The display controller 32 acquires the reference position P0 of the virtual image Iv from an external device (S103).

The display controller 32 acquires the vibration correction amount C3 output from the correction processing device 50, the gradient correction amount C4 output from the gradient correction processing device 60, and a correction overlap amount C5 (S104). Note that, in the present description, the vibration correction amount C3 may be referred to as the first correction amount C3, and the gradient correction amount C4 may be referred to as the second correction amount C4. Further, the correction overlap amount C5 means a correction amount by which the vibration correction amount C3 and the gradient correction amount C4 overlap.

The display controller 32 calculates a total correction amount C6 based on the vibration correction amount C3, the gradient correction amount C4, and the correction overlap amount C5 (S105). For example, the total correction amount C6 is calculated by "vibration correction amount C3+gradient correction amount C4−correction overlap amount C5".

The display controller 32 causes the projection device 10 to display the virtual image Iv based on the reference position P0 and the total correction amount C6 (S106). For example, the display controller 32 reads the image data 33i of the virtual image Iv corresponding to the display target from the storage 33, sets the display position of the virtual image Iv to "reference position P0+total correction amount C6", and outputs the display position to the projection device 10.

The display controller 32 determines whether or not to continue the display processing (S107). For example, the display controller 32 ends the display processing when the engine of the vehicle 200 is stopped or when a button for giving an instruction to end the display of the virtual image Iv is operated. In a case where the display processing is continued, the processing returns to Step S101.

Note that, in Steps S104 to S106 described above, the example in which the vibration correction processing and the gradient correction processing are performed in an overlapping manner is described. However, the present disclosure is not limited to this example. For example, in a case where the vibration correction processing is performed without performing the gradient correction processing, the correction amount C3 of the display position output from the correction processing device 50 may be acquired in Step S104.

In Step S106, the display controller 32 may cause the projection device 10 to display the virtual image Iv on the basis of the reference position P0 and the correction amount C3.

3. Vibration Correction Processing

The vibration correction processing illustrated in FIG. 7 is performed by the correction controller 52 of the correction processing device 50. The vibration correction processing is started, for example, when the engine of the vehicle 200 is started or when a button for instructing the start of displaying the virtual image Iv is operated. The vibration correction processing is started, for example, together with the display processing. Note that the vibration correction processing may be started when the button for instructing the start of the position correction of the virtual image Iv is operated.

The displacement amount calculator 52a acquires the posture variation information indicating the angular velocity output from the gyro sensor 41 (S201). The displacement amount calculator 52a calculates the posture of the vehicle 200, for example, a displacement amount which is an angle with respect to the pitch direction, based on the acquired posture variation information (S202). Specifically, the displacement amount calculator 52a calculates the pitch angle of the vehicle 200 by integrating the angular velocity. The correction amount calculator 52b calculates the vibration correction amount C3 of the display position of the virtual image Iv based on a displacement amount with respect to the pitch directions (S203). Specifically, the correction amount calculator 52b converts the displacement amount of the vehicle 200 in the pitch direction into the number of pixels, and determines the vibration correction amount C3 that cancels a displacement amount indicated by the number of pixels.

In the example illustrated in FIG. 6, the displacement amount corresponds to the inclination θ12 of the vehicle 200. For example, the vibration correction amount C3 is calculated by "C3=θ12×G". Here, G is a conversion coefficient for converting an angle into the number of pixels.

The correction amount calculator 52b outputs the calculated vibration correction amount C3 to the display processing device 30 (S204).

The correction controller 52 determines whether or not to continue the vibration correction processing (S205). For example, the correction controller 52 ends the vibration correction processing when the engine of the vehicle 200 is stopped or when a button for instructing the end of the display of the virtual image Iv is operated. In a case where the vibration correction processing is continued, the processing returns to Step S201.

4. Gradient Correction Processing

The gradient correction processing illustrated in FIG. 7 is performed by the gradient correction controller 62 of the gradient correction processing device 60. The gradient correction processing is started, for example, when the engine of the vehicle 200 is started or when a button for instructing the start of displaying the virtual image Iv is operated. The gradient correction processing is started, for example, together with the display processing. Note that the gradient correction processing may be started when the button for instructing the start of the position correction of the virtual image Iv is operated.

The gradient correction amount calculator 62a calculates a gradient of each position from altitude information of each position on the route (S301). The gradient correction processing device 60 acquires the route information 34 from the display processing device 30, and calculates a gradient of each position on the basis of altitude information at a plurality of positions on the route included in the route information 34.

Figure 8:
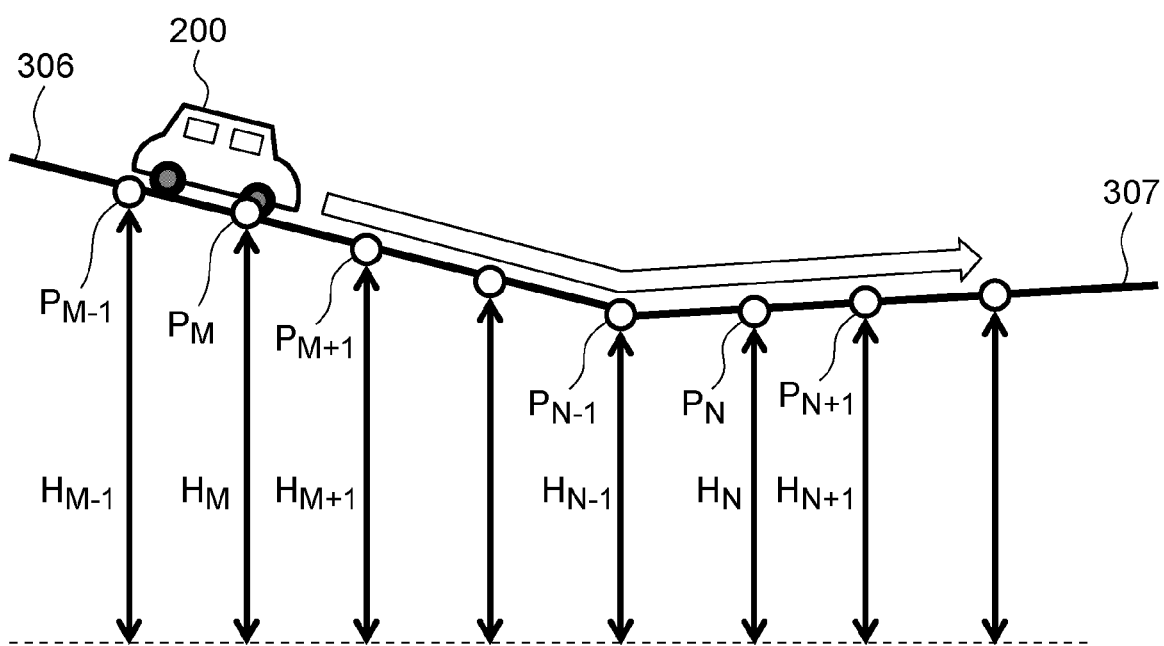
FIG. 8 is an explanatory diagram illustrating an example of calculation of a gradient of a track.

FIG. 8 is an explanatory diagram illustrating an example of calculation of gradients of tracks 306 and 307. As illustrated in FIG. 8, the gradient correction processing device 60 calculates gradients of a plurality of positions for each predetermined distance on the tracks 306 and 307. For example, an example of calculation of a gradient of an own position $P_M$ of the vehicle 200 on the track 306 will be described. The gradient correction processing device 60 calculates the gradient of the own position $P_M$ on the basis of altitude information of a plurality of positions around the own position $P_M$ of the vehicle 200. For example, the gradient correction controller 62 calculates the gradient of the own position $P_M$ on the basis of an altitude $H_M$ of the own position $P_M$ and altitudes $H_{M-1}$ and $H_{M+1}$ of two positions $P_{M-1}$ and $P_{M+1}$ before and after the own position $P_M$. For example, an inclination of the altitude of $P_{M-1}$, $P_M$, and $P_{M+1}$ is calculated. Similarly, a gradient of a position $P_M$ on the track 307 is calculated based on an altitude $H_N$ of the position $P_N$ and altitudes $H_{N-1}$ and $H_{N+1}$ of two positions $P_{M-1}$ and $P_{M+1}$ before and after the position $P_N$. Note that the calculation of a gradient is not limited to the above, and a gradient can be calculated by acquiring gradient information of a plurality of positions from map data, or by various optional methods.

The gradient correction amount calculator 62a acquires the distance L1 from the own position of the vehicle 200 to the superimposition destination position (S302). For example, the gradient correction amount calculator 62a acquires the distance L1 from the own position to the superimposition destination position from the display processing device 30. In the present embodiment, the distance L1 from the own position to the superimposition destination position is set to 50 m.

The gradient correction amount calculator 62a calculates a gradient difference d between the own position and the superimposition destination position (S303). The gradient correction amount calculator 62a acquires information of the position of the vehicle 200 acquired by the information acquisition device 20 from the display processing device 30, and acquires gradient information of the own position of the vehicle 200 on the basis of the information of the position of the vehicle 200. Specifically, the gradient correction amount calculator 62a acquires gradient information of the own position of the vehicle 200 based on the position information of the vehicle 200 and the gradient information of each position calculated in Step S301. Next, the gradient correction amount calculator 62a acquires gradient information of the superimposition destination position on the basis of the gradient information of each position acquired in Step S301 and the information of the distance L1 from the own position to the superimposition destination position acquired in Step S302. The gradient correction amount calculator 62a calculates the gradient difference d between the own position and the superimposition destination position on the basis of the gradient information of the own position and the gradient information of the superimposition destination position.

The gradient correction amount calculator 62a calculates the gradient correction amount C4 based on the gradient difference d (S304). Specifically, the gradient correction amount calculator 62a converts the gradient difference d into the number of pixels, and determines the gradient correction amount C4 that cancels a displacement amount indicated by the number of pixels.

In the example illustrated in FIG. 6, the gradient difference d between the own position Q2 and the superimposition destination position Q3 is a difference between the grade $\theta 11$ of the road surface 304 on which the vehicle 200 travels and the grade $\theta 13$ of the slope 305. That is, in FIG. 6, the gradient of the own position Q2 corresponds to $\theta 11$, and the gradient of the superimposition destination position Q3 corresponds to $\theta 13$. For example, the gradient difference d between the own position Q2 and the superimposition destination position Q3 is calculated by, for example, "d=$\theta 13-\theta 11$". For example, the gradient correction amount C4 is calculated by "C4=d×G". Here, G is a conversion coefficient for converting an angle into the number of pixels.

The correction overlap amount setting unit 62b sets the correction overlap amount C5 on the basis of a road surface inclination of a gradient correction amount calculation point (S305). The road surface inclination at the gradient correction amount calculation point means an inclination of a road surface at the position of the vehicle 200 when the gradient correction amount (second correction amount) is calculated. In the example illustrated in FIG. 6, the grade $\theta 11$ of the road surface 304 at the own position Q2 of the vehicle 200 corresponds to the road surface inclination of the gradient correction amount calculation point. For example, the correction overlap amount C5 is calculated by "C5=$\theta 11$×G". Here, G is a conversion coefficient for converting an angle into the number of pixels.

The gradient correction controller 62 outputs the gradient correction amount C4 and the correction overlap amount C5 to the display processing device 30 (S306).

The gradient correction controller 62 determines whether or not to continue the gradient correction processing (S307). For example, the gradient correction controller 62 ends the gradient correction processing when the engine of the vehicle 200 is stopped or when a button for instructing the end of the display of the virtual image Iv is operated. In a case where the gradient correction processing is continued, the processing returns to Step S301.

5. Effect, Supplement, and the Like

The display system 100 of the present disclosure includes the information acquisition device 20, the display processing device 30, the posture detection device 40, the correction processing device 50, the gradient correction processing device 60, and the correction overlap amount setting unit 62b. The information acquisition device 20 acquires the vehicle-related information including the position information of the vehicle 200. The display processing device 30 controls display of the virtual image Iv on the basis of the vehicle-related information acquired by the information acquisition device 20. The posture detection device 40 detects a posture variation of the vehicle 200. The correction processing device 50 sets the first correction amount (vibration correction amount) C3 of the display position of the virtual image Iv on the basis of a posture variation of the vehicle 200. The gradient correction processing device 60 sets the second correction amount (gradient correction amount) C4 of the display position of the virtual image Iv on the basis of a gradient difference between the position of the vehicle 200 and the superimposition destination position where the virtual image Iv is superimposed on the actual view in front of the vehicle 200. The correction overlap amount setting unit 62b sets the correction overlap amount C5 by which the first correction amount C3 and the second correction amount C4 overlap. The display processing device 30 controls the display of the virtual image Iv on the basis of the first correction amount C3, the second correction amount C4, and the correction overlap amount C5.

With such a configuration, position displacement of the display position of the virtual image Iv with respect to the superimposition target can be suppressed. Specifically, in the display system 100 that performs both the vibration correction processing and the gradient correction processing, overcorrection due to the vibration correction processing and the gradient correction processing performed in an overlapping manner can be suppressed. In this manner, it is possible to suppress deterioration in correction accuracy of the display position of the virtual image Iv.

The correction overlap amount setting unit 62b sets the correction overlap amount C5 based on the inclination θ12 of the road surface 304 at the position Q2 of the vehicle 200 when the second correction amount C4 is calculated. In this manner, overcorrection due to the vibration correction processing and the gradient correction processing performed in an overlapping manner can be further suppressed. As a result, it is possible to further suppress deterioration in the correction accuracy of the display position of the virtual image Iv.

Note that, in the present embodiment, the example in which the correction overlap amount setting unit 62b calculates the correction overlap amount C5 by "C5=θ11×G" is described. However, the present disclosure is not limited to this example. The correction overlap amount setting unit 62b may be able to calculate an overlapping correction amount between the vibration correction amount C3 and the gradient correction amount C4, and the parameter used to calculate the correction overlap amount C5 is not limited to θ11 itself.

Second Embodiment

In the first embodiment, the correction overlap amount setting unit 62b sets the correction overlap amount C5 on the basis of a road surface inclination of the gradient correction amount calculation point. In the present embodiment, the gradient correction processing device 60 calculates the gradient difference d between the own position of the vehicle 200 and the superimposition destination position, and performs the gradient correction when an absolute value of the gradient difference d is equal to or more than a threshold T1. The correction overlap amount setting unit 62b sets the correction overlap amount C5 on the basis of the vibration correction amount C3 during performance of the gradient correction.

Figure 9:
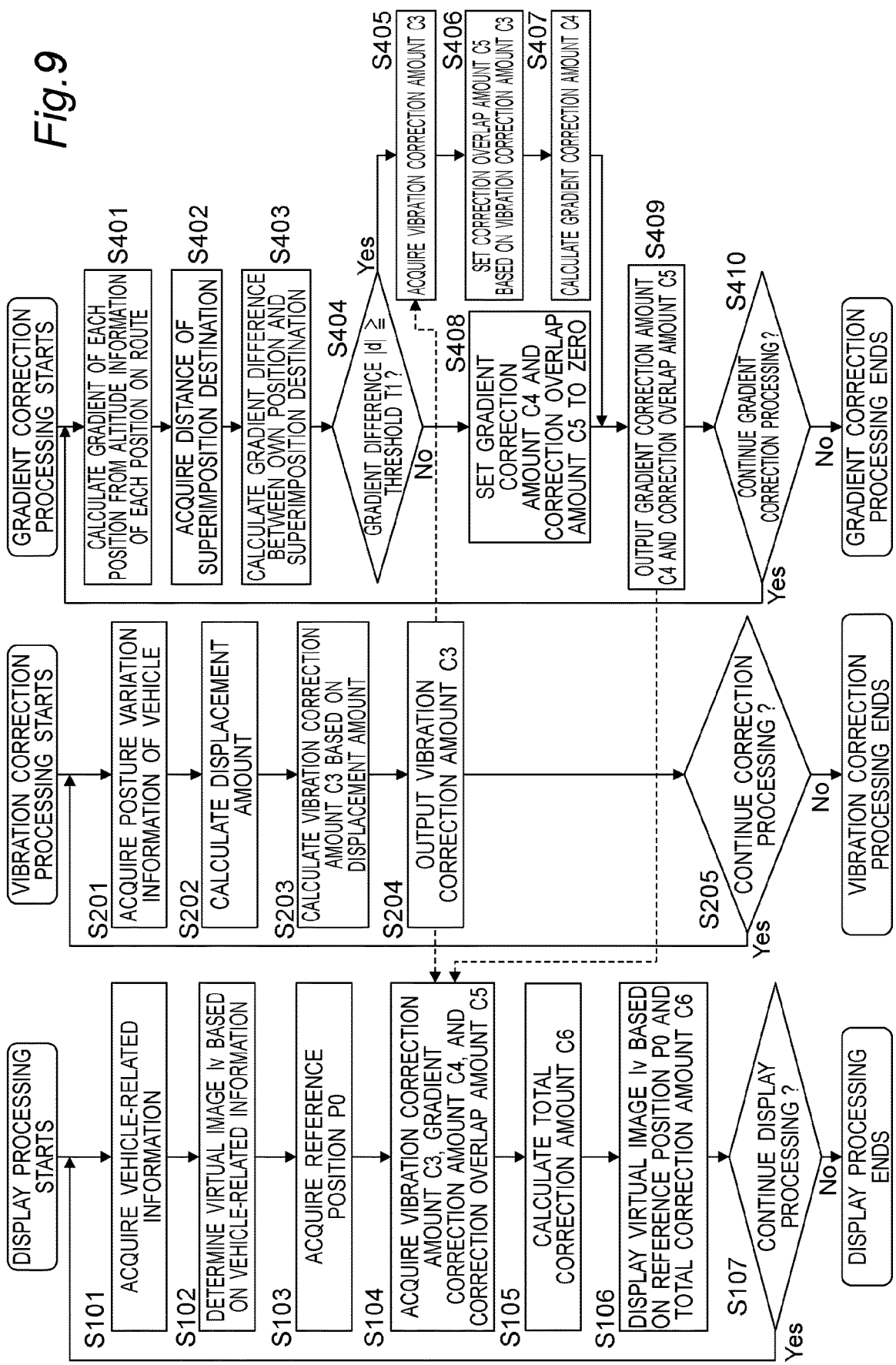
FIG. 9 is a flowchart showing processing of the display system in a second embodiment.

Operation of the display system 100 in a second embodiment will be described with reference to FIG. 9. FIG. 9 is a flowchart showing processing of the display system 100 according to the second embodiment. In steps illustrated in FIG. 9, the same steps as those illustrated in FIG. 7 of the first embodiment are denoted by the same reference numerals. Further, Steps S401 to S403, S407, and S410 of FIG. 9 are the same as Steps S301 to S303, S304, and S307 of FIG. 7 of the first embodiment, respectively.

In the display processing illustrated in FIG. 9, the display controller 32 acquires the vehicle-related information from the information acquisition device 20 (S101). The display controller 32 determines the virtual image Iv to be displayed based on the vehicle-related information (S102). The display controller 32 acquires the reference position P0 of the virtual image Iv from an external device (S103). The display controller 32 acquires the vibration correction amount C3 output from the correction processing device 50, the gradient correction amount C4 output from the gradient correction processing device 60, and a correction overlap amount C5 (S104). The display controller 32 calculates a total correction amount C6 based on the vibration correction amount C3, the gradient correction amount C4, and the correction overlap amount C5 (S105). The display controller 32 causes the projection device 10 to display the virtual image Iv based on the reference position P0 and the total correction amount C6 (S106). The display controller 32 determines whether or not to continue the display processing (S107).

In the vibration correction processing shown in FIG. 9, the displacement amount calculator 52a acquires the posture variation information indicating the angular velocity output from the gyro sensor 41 (S201). The displacement amount calculator 52a calculates the posture of the vehicle 200, for example, a displacement amount which is an angle with respect to the pitch direction, based on the acquired posture variation information (S202). The correction amount calculator 52b calculates the vibration correction amount C3 of the display position of the virtual image Iv based on a displacement amount with respect to the pitch directions (S203). The correction amount calculator 52b outputs the calculated vibration correction amount C3 to the display processing device 30 and the gradient correction processing device 60 (S204). The correction controller 52 determines whether or not to continue the vibration correction processing (S205).

In the gradient correction processing shown in FIG. 9, the gradient correction amount calculator 62a calculates a gradient of each position from altitude information of each position on the route (S401). The gradient correction amount calculator 62a acquires the distance L1 from the own position to the superimposition destination position (S402). The gradient correction amount calculator 62a calculates the gradient difference d between the own position and the superimposition destination position (S403).

The gradient correction controller 62 determines whether or not an absolute value of the calculated gradient difference d is equal to or more than the threshold T1 (S404).

In Step S404, in a case where the absolute value of the gradient difference d is equal to or more than the threshold T1, the correction overlap amount setting unit 62b acquires the vibration correction amount C3 from the correction processing device 50 (S405). The correction overlap amount setting unit 62b sets the correction overlap amount C5 based on the vibration correction amount C3 (S406). For example, the correction overlap amount C5 is set to a value equal to the vibration correction amount C3. Next, the gradient correction amount calculator 62a calculates the gradient correction amount C4 based on the gradient difference d (S407).

In Step S404, in a case where the absolute value of the gradient difference d is smaller than the threshold T1, the gradient correction controller 62 sets the gradient correction amount C4 and the correction overlap amount C5 to zero (S408). Specifically, the gradient correction amount calculator 62a sets the gradient correction amount C4 to zero. The correction overlap amount setting unit 62b sets the correction overlap amount C5 to zero.

The gradient correction controller 62 outputs the gradient correction amount C4 and the correction overlap amount C5 to the display processing device 30 (S409).

The gradient correction controller 62 determines whether or not to continue the gradient correction processing (S410).

As described above, in the present embodiment, the gradient difference d between the own position of the vehicle 200 and the superimposition destination position is calculated, and the gradient correction is performed when an absolute value of the gradient difference d is equal to or more than the threshold T1. Further, the correction overlap amount setting unit 62b sets the correction overlap amount C5 on the basis of the vibration correction amount C3 during performance of the gradient correction. With such a configuration, position displacement of the display position of the virtual image Iv can be suppressed. That is, it is possible to suppress overcorrection due to the vibration correction processing and the gradient correction processing performed in an overlapping manner, and it is possible to suppress deterioration in correction accuracy of the display position of the virtual image Iv.

Note that, in the present embodiment, the example in which the correction overlap amount setting unit 62b sets the correction overlap amount C5 to a value equal to the vibration correction amount C3 is described. However, the present invention is not limited to this example. The correction overlap amount setting unit 62b may adjust the correction overlap amount C5 based on the vibration correction amount C3.

The correction processing device 50 may set the vibration correction amount C3 to zero while the gradient correction processing is performed. In this case, the correction overlap amount setting unit 62b sets the correction overlap amount to zero. Even in such a configuration, it is possible to suppress deterioration in correction accuracy of the display position of the virtual image Iv.

The example in which the gradient correction processing device 60 determines whether or not to perform the gradient correction on the basis of the gradient difference between the own position of the vehicle 200 and the superimposition destination position of the virtual image Iv is described. However, the present disclosure is not limited to this example. The gradient correction processing device 60 may determine whether or not to perform the gradient correction on the basis of gradient information between the own position of the vehicle 200 and the superimposition destination position. For example, the gradient correction processing device 60 may determine whether or not to perform the gradient correction on the basis of a gradient ratio between the own position of the vehicle 200 and the superimposition destination position.

Other Embodiments

As described above, the embodiments have been described as an example of the technique disclosed in the present application. However, the technique in the present disclosure is not limited to this, and is also applicable to an embodiment in which changes, replacements, additions, omissions, and the like are appropriately made. In view of the above, other embodiments will be exemplified below.

The above embodiment illustrates the case where the projection device 10, the information acquisition device 20, the display processing device 30, the posture detection device 40, the correction processing device 50, and the gradient correction processing device 60 are separate devices. However, a plurality of devices may be integrally formed as one device. For example, the display processing device 30 and the correction processing device 50 may be integrally formed as one device. The information acquisition device 20 and the display processing device 30 may be integrally formed as one device. The posture detection device 40 and the correction processing device 50 may be integrally formed as one device. The display processing device 30 and the gradient correction processing device 60 may be integrally formed as one device. The correction processing device 50 and the gradient correction processing device 60 may be integrally formed as one device. The separately formed devices are connected in a manner communicable with each other by wire or wirelessly. Note that all the projection device 10, the information acquisition device 20, the display processing device 30, the posture detection device 40, the correction processing device 50, and the gradient correction processing device 60 may be formed as one device. In this case, the communicators 31, 51, and 61 may be omitted.

The above embodiment describes the example in which the information acquisition device 20 includes the GPS module 21. However, the information acquisition device 20 may include a distance sensor that measures a distance and a direction from the vehicle 200 to a surrounding object, and may output distance information indicating the measured distance and direction to the display processing device 30. The information acquisition device 20 may include a vehicle speed sensor that detects the speed of the vehicle 200, or may include a navigation system. The information acquisition device 20 may include one or more of the GPS module 21, a distance sensor, a camera, an image processing device, an acceleration sensor, a radar, a sound wave sensor, and a white line detection device of advanced driver-assistance systems (ADAS). In this case, the GPS module 21 having a function as the information acquisition device 20, the distance sensor, the camera, and the like may be built in one device or individually attached to the vehicle 200.

The above embodiment describes the example in which the posture detection device 40 includes the gyro sensor 41. However, the posture detection device 40 may include an acceleration sensor that detects the acceleration of the vehicle 200, and may output the detected acceleration as the posture variation information. The posture detection device 40 may include a vehicle height sensor that detects the height from the road surface, and may output the detected height as the posture variation information. The posture detection device 40 may include other publicly-known sensors. The posture detection device 40 may include one or more of the gyro sensor 41, the acceleration sensor, the vehicle speed sensor, and the like. In this case, the gyro sensor 41 having the function of the posture detection device 40, the acceleration sensor, the vehicle height sensor, and the like may be built in one device or individually attached to the vehicle 200.

In the above embodiment, the example in which the correction overlap amount setting unit 62b is included in the gradient correction processing device 60 is described. However, the present disclosure is not limited to this example. The correction overlap amount setting unit may be included in the display processing device 30. Alternatively, the correction overlap amount setting unit may be included in the correction processing device 50.

Figure 10:
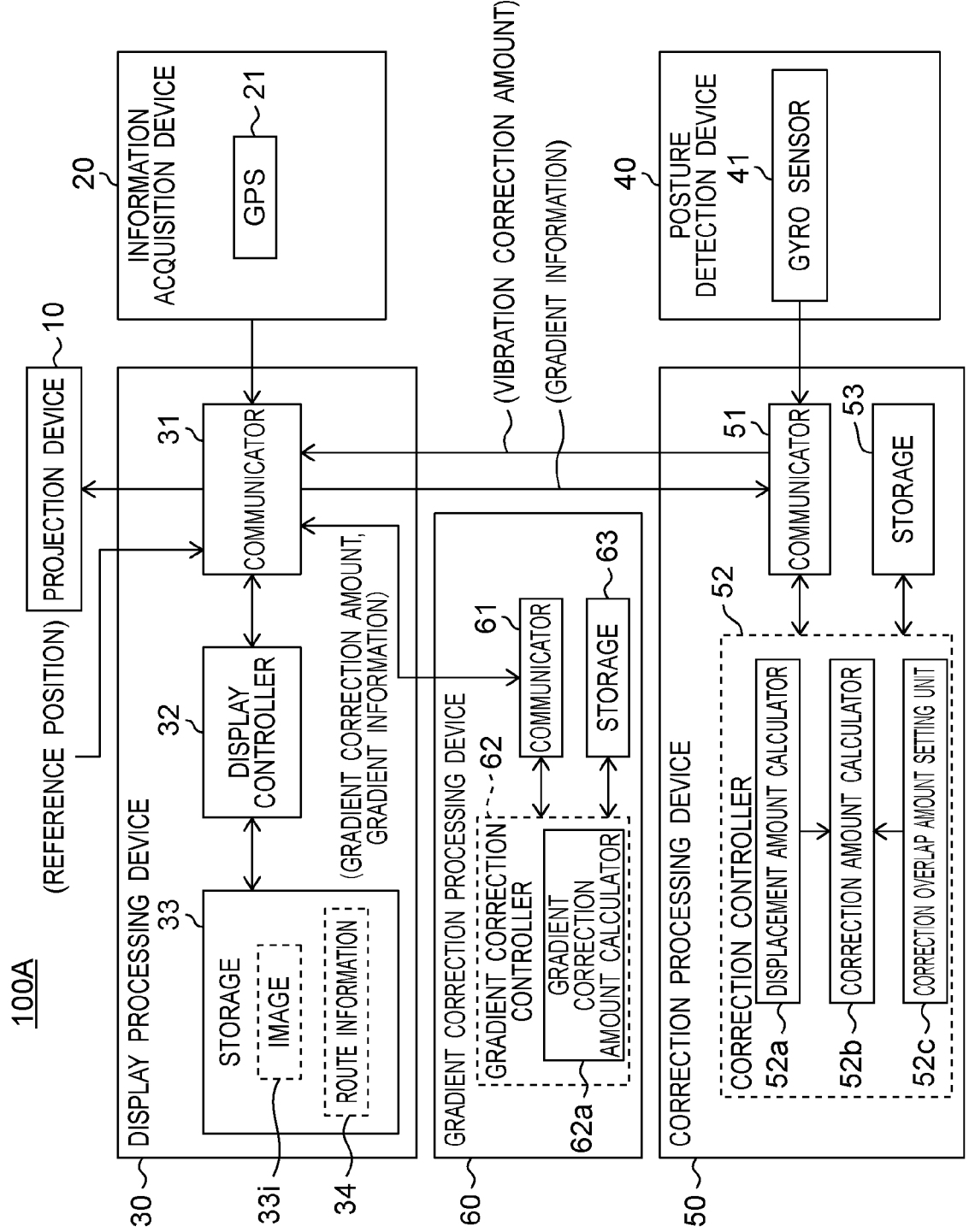
FIG. 10 is a block diagram illustrating an internal configuration of the display system according to a variation.

FIG. 10 is a block diagram illustrating an internal configuration of a display system 100A according to a variation. In the display system 100A illustrated in FIG. 10, a correction overlap amount setting unit 52c is included in the correction processing device 50. In the display system 100A, the display processing device 30 outputs the gradient information calculated by the gradient correction processing device 60 to the correction processing device 50. The gradient information includes, for example, information on a road surface inclination at the gradient correction amount calculation point. The correction overlap amount setting unit 52c sets the correction overlap amount C5 on the basis of the gradient information and outputs the correction overlap amount C5 to the correction amount calculator 52b. The correction amount calculator 52b subtracts the correction overlap amount C5 from the vibration correction amount C3 and outputs the subtracted vibration correction amount to the display processing device 30. Even in such a configuration, it is possible to suppress overcorrection due to the vibration correction processing and the gradient correction processing performed in an overlapping manner, and it is possible to suppress deterioration in correction accuracy of the display position of the virtual image Iv.

In the above embodiment, the example in which the display controller 32 calculates the total correction amount C6 by "vibration correction amount C3+gradient correction amount C4−correction overlap amount C5" is described. However, the present disclosure is not limited to this example. The display controller 32 may calculate the total correction amount C6 by adjusting the correction overlap amount C5. For example, the display controller 32 may adjust the correction overlap amount C5 using a correction coefficient α as the correction overlap amount C5. As an example, the display controller 32 may calculate the total correction amount C6 by "vibration correction amount C3+gradient correction amount C4−correction overlap amount C5×correction coefficient α".

The above embodiment describes the case where the moving body is the vehicle 200 such as an automobile.

However, the moving body is not limited to the vehicle 200. The moving body may be a vehicle that travels on the ground, and may be, for example, a train or a motorcycle. The moving body may be an unmanned aircraft that is capable of autonomous driving.

The above embodiment describes the case where the image is displayed in front of the moving body. However, the position where the image is displayed is not limited to the front. For example, the image may be displayed in the side direction or in the rear of the moving body.

The above embodiment describes the example in which the display system 100 is an HUD system. However, the display system 100 may not be an HUD system. The display system 100 may include a liquid crystal display or an organic EL display instead of the projection device 10. Display system 100 may include a screen and a projector.

Outline of Embodiment (1) The display system of the present disclosure includes an information acquisition device that acquires a position of a moving body, a display processing device that controls display of an image based on information acquired by the information acquisition device, a posture detection device that detects a posture variation of the moving body, a correction processing device that sets a first correction amount of a display position of the image based on the posture variation of the moving body, a gradient correction processing device that sets a second correction amount of a display position of the image based on gradient information at a position of the moving body and a superimposition destination position at which the image is superimposed on an actual view in a display direction of the image, and a correction overlap amount setting unit that sets a correction overlap amount by which the first correction amount and the second correction amount overlap. The display processing device controls display of the image based on the first correction amount, the second correction amount, and the correction overlap amount. In this manner, it is possible to suppress position displacement of a display position of an image.

(2) In the display system of (1), the correction overlap amount setting unit may set the correction overlap amount based on an inclination of a road surface at the position of the moving body when the second correction amount is calculated.

(3) In the display system of (1), the gradient correction processing device may determine whether or not to perform gradient correction using the second correction amount based on the gradient information.

(4) In the display system of (3), the gradient correction processing device may calculate a gradient difference between the position of the moving body and the superimposition destination position, and perform the gradient correction when the gradient difference is equal to or more than a threshold.

(5) In the display system of (3) or (4), the correction overlap amount setting unit may set the correction overlap amount based on the first correction amount obtained during performance of the gradient correction.

(6) In the display system of any one of (1) to (5), the gradient information of the position of the moving body may include information on a gradient calculated based on altitude information of a plurality of positions around the position of the moving body, and the gradient information of the superimposition destination position may include information on a gradient calculated based on altitude information of a plurality of positions around the superimposition destination position.

(7) In the display systems of any one of (1) to (6), the correction overlap amount setting unit may adjust the correction overlap amount by a correction coefficient.

(8) The display system of any one of (1) to (7) may further include a projection device that projects light representing an image.

(9) In the display system of any one of (1) to (8), the moving body may be a vehicle, and the image may be a virtual image displayed in front of a windshield of a vehicle.

INDUSTRIAL APPLICABILITY

The present disclosure can be applied to a display system that displays a virtual image in front of a windshield.

The invention claimed is:

1. A display system comprising:
a processor;
a memory having stored thereon instructions executable by the processor;
wherein the instructions comprise:
acquiring a position of a moving body;
controlling display of an image based on information acquired by the information acquisition device;
detecting an angle displacement variation of the moving body;
setting a first correction amount of a display position of the image based on the angle displacement variation of the moving body;
setting a second correction amount of the display position of the image based on gradient information of a travel route at a position of the moving body and a superimposition destination position at which the image is superimposed on an actual view in a display direction of the image; and determining an overcorrection of the display position of the image based on the first correction amount and the second correction amount; and setting an over correction amount by which the first correction amount and the second correction amount have over corrected the display position of the image, wherein the controlling the display of the image includes controlling the display position of the image based on the first correction amount, the second correction amount, and the over correction amount.

2. The display system according to claim 1, wherein the setting the over correction amount includes setting the over correction amount based on an inclination of a road surface at the position of the moving body when the second correction amount is calculated.

3. The display system according to claim 2, wherein the gradient information of the position of the moving body includes information on a gradient calculated based on altitude information of a plurality of positions around the position of the moving body, and the gradient information of the superimposition destination position includes information on a gradient calculated based on altitude information of a plurality of positions around the superimposition destination position.

4. The display system according to claim 2, wherein the setting the over correction amount includes adjusting the over correction amount by a correction coefficient.

5. The display system according to claim 2, wherein the instructions further comprise projecting light representing the image.

6. The display system according to claim 1, wherein the controlling the display of the image includes determining whether or not to perform gradient correction using the second correction amount based on the gradient information.

7. The display system according to claim 6, wherein the instructions further comprise:

calculating a gradient difference between the position of the moving body and the superimposition destination position, and wherein the determining whether or not to perform gradient correction determines performing the gradient correction when the gradient difference is equal to or more than a threshold.

8. The display system according to claim 7, wherein the setting the over correction amount includes setting the over correction amount based on the first correction amount obtained during performance of the gradient correction.

9. The display system according to claim 7, wherein the gradient information of the position of the moving body includes information on a gradient calculated based on altitude information of a plurality of positions around the position of the moving body, and the gradient information of the superimposition destination position includes information on a gradient calculated based on altitude information of a plurality of positions around the superimposition destination position.

10. The display system according to claim 7, wherein the setting the over correction amount includes adjusting the over correction amount by a correction coefficient.

11. The display system according to claim 6, wherein the setting the over correction amount includes setting the over correction amount based on the first correction amount obtained during performance of the gradient correction.

12. The display system according to claim 11, wherein the gradient information of the position of the moving body includes information on a gradient calculated based on altitude information of a plurality of positions around the position of the moving body, and the gradient information of the superimposition destination position includes information on a gradient calculated based on altitude information of a plurality of positions around the superimposition destination position.

13. The display system according to claim 11, wherein the setting the over correction amount includes adjusting the over correction amount by a correction coefficient.

14. The display system according to claim 6, wherein the gradient information of the position of the moving body includes information on a gradient calculated based on altitude information of a plurality of positions around the position of the moving body, and the gradient information of the superimposition destination position includes information on a gradient calculated based on altitude information of a plurality of positions around the superimposition destination position.

15. The display system according to claim 6, wherein the setting the over correction amount includes adjusting the over correction amount by a correction coefficient.

16. The display system according to claim 1, wherein the gradient information of the position of the moving body includes information on a gradient calculated based on altitude information of a plurality of positions around the position of the moving body, and the gradient information of the superimposition destination position includes information on a gradient calculated based on altitude information of a plurality of positions around the superimposition destination position.

17. The display system according to claim 16, wherein the setting the over correction amount includes adjusting the over correction amount by a correction coefficient.

18. The display system according to claim 1, wherein the setting the over correction amount includes adjusting the over correction amount by a correction coefficient.

19. The display system according to claim 1, wherein the instructions further comprise projecting light representing the image.

20. The display system according to claim 1, wherein the moving body is a vehicle, and the image is a virtual image displayed in front of a windshield of a vehicle.

* * * * *